United States Patent [19]

MacInnis

[11] Patent Number: 5,172,603
[45] Date of Patent: Dec. 22, 1992

[54] ELECTRICALLY ACTUATED SHIFTING METHOD AND APPARATUS

[76] Inventor: Richard F. MacInnis, P.O. Box 2541, White City, Oreg. 97503

[21] Appl. No.: 695,688

[22] Filed: May 3, 1991

[51] Int. Cl.$^5$ .................. F16H 59/10; F16H 59/12
[52] U.S. Cl. .................. 74/335; 74/364; 74/473 R; 74/745; 200/61.88
[58] Field of Search .............. 74/335, 364, 473 R, 74/745; 200/61.88

[56] References Cited

U.S. PATENT DOCUMENTS

| | | | |
|---|---|---|---|
| 2,445,716 | 7/1948 | Sternberg | 74/745 |
| 2,522,228 | 9/1950 | Hukill | 74/745 X |
| 2,582,895 | 1/1952 | Young | 74/745 |
| 2,637,222 | 5/1953 | Backus | 74/745 |
| 2,640,374 | 6/1953 | Willis | 74/745 |
| 2,654,268 | 10/1953 | Perkins | 74/745 |
| 2,738,690 | 3/1956 | Perkins | 74/745 |
| 3,894,442 | 7/1975 | Hembree | 200/61.91 X |
| 3,941,009 | 3/1976 | Brown | 200/61.88 X |
| 4,199,747 | 4/1980 | Miller et al. | 200/61.88 X |
| 4,360,718 | 11/1982 | Schobinger et al. | 200/61.88 |
| 4,722,248 | 2/1988 | Braun | 74/745 X |

*Primary Examiner*—Allan D. Herrmann

[57] ABSTRACT

A method and apparatus for electrically activating range shift apparatus in transmissions of trucks or the like wherein such activation is customarily accomplished by actuation of valves on air lines from the shift apparatus knob to the proximity of the transmission, such air lines, or the like, are directed along a shift bar from the transmission area up to the knob of the shift bar and then along the shift bar to the point of actuating shift changes in the transmission. In the present case electrical switch apparatus in the knob of the shift bar is provided which electrically actuates a low voltage solenoid valve arrangement which controls the transmission's air actuated shifting means without the need of relays, and the like.

1 Claim, 2 Drawing Sheets

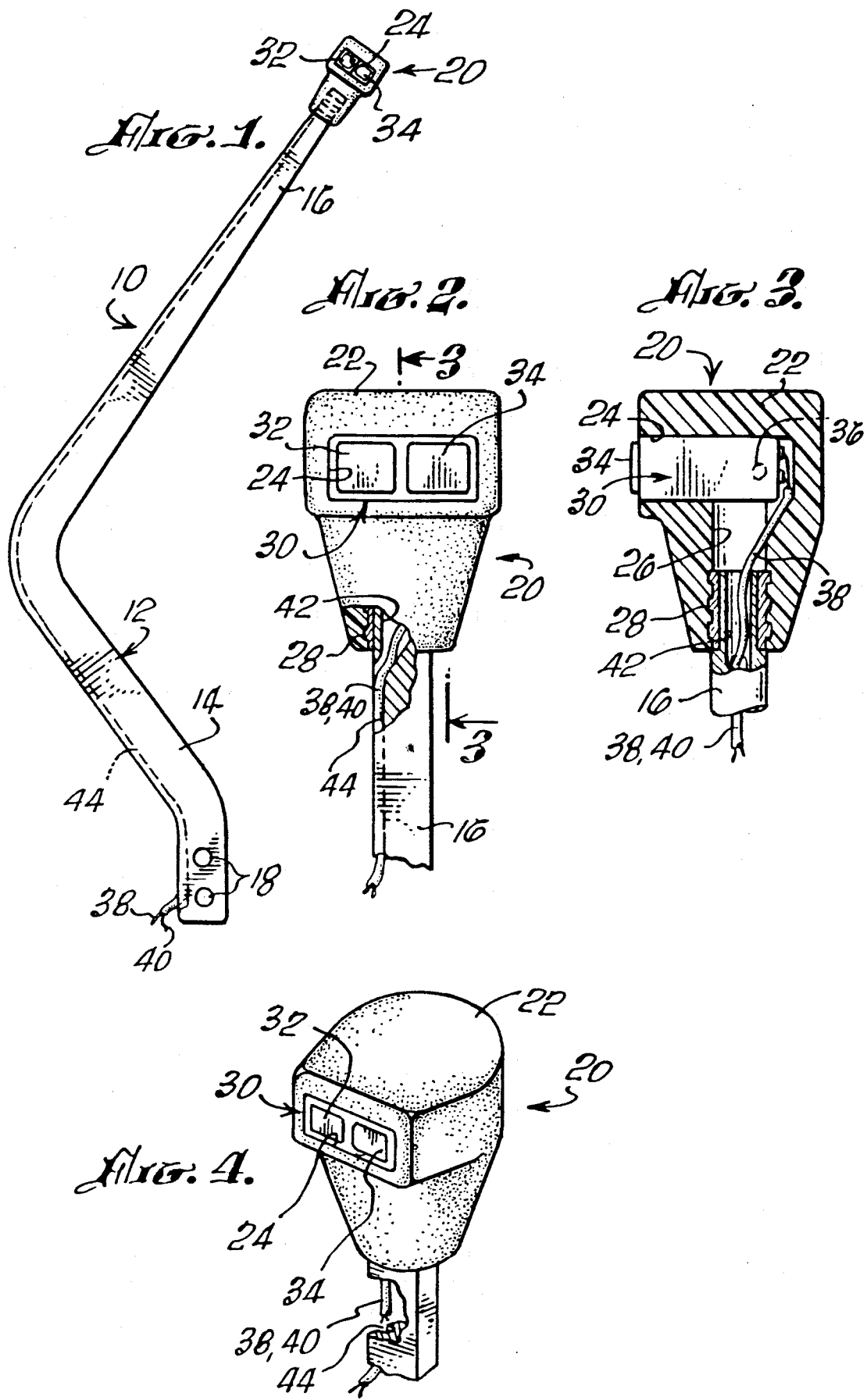

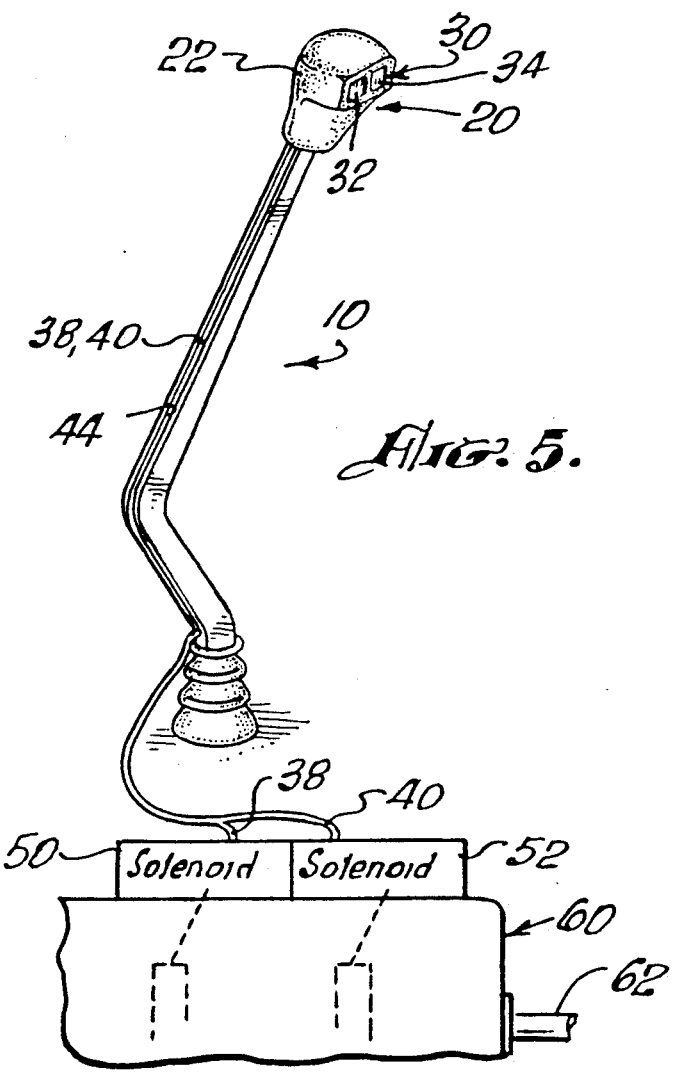
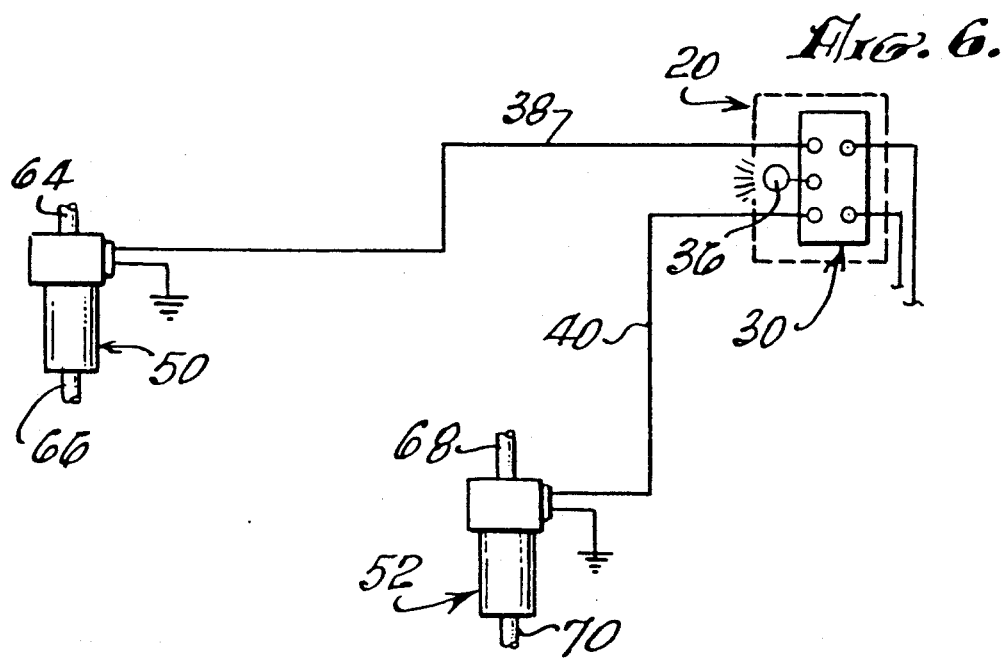

ELECTRICALLY ACTUATED SHIFTING METHOD AND APPARATUS

CROSS REFERENCE TO RELATED PATENT APPLICATIONS

There are no patent applications filed by me related to this invention except for my applications for SHIFTING METHOD AND APPARATUS, Ser. No. 07/120,033 filed Nov. 13, 1987, now U.S. Pat. No. 5,012,888, and SHIFT BAR, Ser. No. 07/120,032 filed Nov. 13, 1987 now abandoned

BACKGROUND OF THE INVENTION

I. Field of the Invention

This invention is in the general field of mechanism for shifting transmissions from one drive to another; the invention is even more particularly directed to a control lever or shift bar for accomplishing the change between the transmission modes; the invention is even more particularly directed to a shift bar having means associated therewith to electrically activate pneumatic hoses or the like utilized in the shifting process; the invention is even more particularly directed to such a shift bar wherein a new type knob is used having an electrical switching connection therein and wherein electrical wires which are activated by the switch in the knob are carried within a slot or otherwise protected area in the shift bar.

II. Description of the Prior Art

All of the prior art known to me for shift bars in trucks, truck tractors, and the like, comprise round rods with a handle and in some cases tape or other fastening material utilized for the purpose of holding pneumatic hoses or the like associated with the shifting process against the exterior of said rods.

I have in this invention, for the first time, eliminated pneumatic hoses or the like associated directly with the shift bar. This even eliminates and supersedes, where desired, my invention referred to in the CROSS REFERENCE TO RELATED PATENT APPLICATIONS above and therefore there is no prior art of any nature known to me wherein the knob of the shift bar carries electrical switching arrangement as described herein and wherein the shift bar itself carries electrical conducting wires directly to the transmission area for activation and control of the air lines required in shifting the ranges in the transmission of the vehicle involved directly through low voltage actuated solenoid valves.

SUMMARY OF THE INVENTION

Many vehicles and the like, and particularly automotive truck tractors and trucks are equipped with transmission for changing speeds (and direction of travel) as is known to those skilled in the art. Most of the heavier equipment of this nature utilizes transmission shifting apparatus which comprises a combination of a manually activated shifting bar in combination with a pneumatically assisted apparatus for changing the ranges. There are air lines or the like which activate this system of changing ranges. This will be understood by those skilled in the art in that customarily a large truck or the like will have two or three transmission ranges and then within each range there will be a number of gear shift positions. The shifting rod itself is utilized for the purpose of shifting from gear position to another gear position within each range. However, in changing the basic range, this is done by the use of air hoses as will be known to those skilled in the art wherein the hose will be activated to activate a cylinder or the like in conjunction with the transmission which will change the entire shift range. The shift bar is customarily a rod of round cross section with a handle at one end and a connection adjacent the transmission at the other end. Normally a number of pneumatic hoses (usually three or four) will extend from the handle to an arrangement by which they may go through the floor of the cab and connect to a cooperative relationship with the transmission for pneumatically changing ranges of the transmission. These hoses will either hang loosely from the handle or they may be taped, wired or otherwise held in some connection with the shift bar. This arrangement is not only unsightly, but creates the possibility of the hoses tangling with other objects, including, but not limited to, the foot or leg of the vehicle operator. It is not at all uncommon for hoses to be broken or damaged because the lines are external and are taped or tied to the outside of existing shift bars or may even be completely loose hanging therefrom, and are easily damaged particularly where they run through the floorboard.

Additionally, the round bar is susceptible of bending when subjected to heavy and sudden pressures in shifting.

I have conceived and developed a new and superior shift rod in which the hoses are carried within the rod, and which is the subject of a separate patent application file by me as referred to in CROSS REFERENCE TO RELATED PATENT APPLICATIONS. However, I have gone a step further and have conceived a completely novel arrangement wherein I have designed an esthetically shaped shift knob along with an improved shift handle construction for incorporating switches and wiring to the transmission. I have also eliminated the need for relays in the circuitry for the actuation of improved solenoid valves for controlling the air lines in the pneumatically assisted range changing mechanism of the transmission.

By doing these improvements I have eliminated the complexities associated with the electrical systems used previously and have brought the cost of installation and equipment of such systems considerably.

It is an object of this invention to eliminate the need for air hoses to be attached to the shifting handle and knob of the vehicle.

It is a further object of this invention to simplify the installation and cost of electrical systems for actuating the shifting of the range in truck transmissions, and the like.

Another object of this invention is to prevent the lapse of time necessary for the required pressure to activate the range shifting in a transmission.

The foregoing and other objects and advantages of this invention will become apparent to those skilled in the art upon reading the description of a preferred embodiment, which follows, in conjunction with a review of the appended drawings.

BRIEF DESCRIPTION OF THE DRAWINGS

FIG. 1 is a side elevation, on a reduced scale, of the improved shift bar and gripping handle of this invention;

FIG. 2 is an enlarged fragmentary, with portions broken away, of the upper portion of FIG. 1;

FIG. 3 is a fragmentary section, with certain parts in elevation, as viewed along the section line 3—3 of FIG. 2;

FIG. 4 is a partial perspective of the knob and upper portion of the shift bar, partly broken away, of the device of FIGS. 1-3;

FIG. 5 is a perspective view of the shift bar and knob shown on the floor of the cab of the vehicle, and with the transmission and associated solenoid valves illustrated in schematic form; and FIG. 6 is a simplified wiring arrangement to illustrate the method and apparatus of this improved invention.

DESCRIPTION OF A PREFERRED EMBODIMENT

Referring primarily to FIGS. 1 and 5, it can be seen that a shifting bar 10, generally, comprises a handle 12 which has a substantially thicker lower portion 14, and an upper elongated portion 16. Appropriate openings 18 are located at the lowermost end for the purpose of attachment to transmission shifting control linkage.

At its upper end, the handle portion 16 is affixed to a knob member 20. This comfortable gripping design of the handle includes a main body portion 22, a cavity 24 and a connecting opening 26. Molded, or pressed, the upper part of handle 16 is affixed at 28 to knob member 20.

Switch containing module 30, as seen most clearly in the section of FIG. 3, is pressed or otherwise adhered into the cavity 24. Individual switches 32 and 34 are shown in FIG. 2 as part of the switch module 30. The switches 32 and 34 are placed on the knob 20 in such orientation so that the operator of the vehicle can easily actuate one or the other of the switches. A light within the module 30 is illuminated when either of the switches is actuated to let the operator know that his shifting procedure is in effect.

Appropriate wiring is furnished through electrical wiring which comprises wire leads 38 and 40 which communicate to an electrical power source and to the actuating solenoids in the proximity of the transmission.

The upper portion of the handle 10 is provided with a hollow area 42 through which wiring 38, 40 is passed from the cavity 24 into an elongated channel that has been formed along the length of the handle 10. The channel 44 is of sufficient size so as to snugly accommodate the wiring all the way down to the floorboard area of the vehicle.

If desired, the wiring can be attached to the shift handle of conventional shift bars of cylindrical configuration in a suitable manner, but I have found that this channel which I have provided in the portion of the handle away from the knee and hand of the operator keeps the wiring from being damaged or broken.

In the schematic views of FIGS. 5 and 6 I have shown a pair of solenoid valves 50 and 52 located at the transmission area. These solenoid valves effectively are actuated by a low voltage current easily furnished by the electrical system of the vehicle. In operation, the shifting bar, or handle, will be used in the customary manner to shift from one gear setting to another within a range which may encompass as many as seven different individual gearing ratios within one fundamental range. Customarily, when all of the individual settings within one range have been exhausted, then the switch will be used to carry low voltage current directly to a solenoid valve to activate the appropriate pressure to cause the gear shift range desired to be activated. Within the changed range, the same shift bar is used to shift to different gear ratios within that range. This will be understood by those skilled in the art and accustomed to the workings of transmissions having various ranges as well as various ratios within each range.

Pneumatic incoming lines 64 and 68, along with outgoing lines 66 and 70 are shown in FIG. 6 passing through the aforementioned solenoid valves 50 and 52, respectively. the switch module is shown at 30, housed in knob 20 and lamp 36 is shown located within the arrangement. Lead lines 38 and 40 connect all the wiring essentials located in the handle to the solenoids.

While the embodiment of this invention shown and described is fully capable of achieving the objects and advantages desired, it is to understood that such embodiment is for the purpose of illustration only and not for purposes of limitation.

I claim:

1. Apparatus for assisting the activation of an automotive transmission shifting mechanism comprising: an automotive shift lever knob containing a first electrical switch and a second electrical switch each said first and second switch having a separate actuator; a first source of electrical energy connected to each of said switches; a first solenoid actuated pneumatic valve; a second solenoid actuated pneumatic valve; a pneumatic line connected to each of said pneumatic valves; pneumatic means connected from each of said pneumatic valves to an automotive transmission shifting mechanism; electrical energy conducting means connected to each of said switches and to each of said solenoid activated valves; and electrical energy conducting means connected to each of said solenoid operated pneumatic valves.

* * * * *